United States Patent [19]

Katahira

[11] Patent Number: 5,618,114

[45] Date of Patent: Apr. 8, 1997

[54] HARDENED GUIDE RAIL FOR LINEAR GUIDE APPARATUS

[75] Inventor: Masayuki Katahira, Saitama, Japan

[73] Assignee: NSK. Ltd., Tokyo, Japan

[21] Appl. No.: 528,705

[22] Filed: Sep. 15, 1995

[30] Foreign Application Priority Data

Sep. 16, 1994 [JP] Japan .................................. 6-221880

[51] Int. Cl.$^6$ .................................................. F16C 29/06
[52] U.S. Cl. ................................................ 384/45; 384/625
[58] Field of Search ................................ 384/43, 44, 45, 384/50, 55, 49, 625

[56] References Cited

U.S. PATENT DOCUMENTS

| | | | |
|---|---|---|---|
| 4,553,793 | 11/1985 | Teramachi | 384/45 |
| 4,593,957 | 6/1986 | Hidano | 384/49 |
| 5,250,126 | 10/1993 | Ohya et al. | 384/45 X |
| 5,322,370 | 6/1994 | Gallone | 384/625 X |

*Primary Examiner*—Thomas R. Hannon
*Attorney, Agent, or Firm*—Sughrue, Mion, Zinn, Macpeak & Seas

[57] ABSTRACT

In a guide rail for a linear guide apparatus including a plurality of rolling elements and a slider, the guide rail includes a pair of rolling grooves formed in side surfaces of the guide rail for supporting the slider through the rolling elements, the rolling-element rolling grooves axially extending in parallel with each other, a pair of hardened surface layers formed continuously all over the side surfaces by subjecting the side surfaces to induction hardening, and a hole formed penetratingly in a soft portion existing between the hardened surface layers for fixing the guide rail. The hardened surface layers thus formed are sufficient to receive a shearing force which is applied to the guide rail when the linear guide apparatus is in operation.

2 Claims, 3 Drawing Sheets

HARDENED GUIDE RAIL FOR LINEAR GUIDE APPARATUS

BACKGROUND OF THE INVENTION

The present invention relates to a guide rail which is one of the component parts of a linear guide apparatus, and more particularly to the guide rail for a linear guide apparatus which is improved by a heat treatment to increase the fatigue strength under repeated loads.

Conventionally, as a heat treatment to which the guide rail of a linear guide apparatus is subjected in order to increase the fatigue strength, for instance, a carburizing and hardening, an induction hardening or the like is employed ("General Catalogue CAT-1501" published by NSK Ltd., Oct 1984, p. 28).

In the heat treatment, the carburizing and hardening is performed by impregnating a surface of a low carbon steel with carbon to uniformly harden the entire surface. In this case, as shown in FIG. 6, a guide rail 1 is machined to form mounting bolt holes 4 after the guide rail 1 is subjected to carburizing and hardening. Hence, the surfaces 1S which are to be machined must partially be subjected to a carburization preventing treatment in advance.

On the other hand, in induction hardening, induction coils 2 are disposed at each position confronted with ball rolling grooves 1a and 1b formed in both side surfaces of a guide rail 1 as shown in FIG. 7. The induction coils 2 are connected to a high-frequency power source, so that the side surfaces of the guide rail which are confronted with the induction coil 2 are locally hardened. That is, high-frequency induction current flows in the surface layers of the guide rail 1 in the neighborhood of the ball rolling grooves 1a and 1b, so that those surface layers are heated with the ball rolling grooves 1a and 1b. Thereafter, those surface layers are cooled to form hardened layers 3.

However, the conventional carburizing and hardening has a disadvantage in that a superfluous carburization preventing treatment is required for portions of the guide rail 1 which must be subjected to post machining. In addition, the dimension of the guide rail as a workpiece to be treated is limited by the dimension of a given heat treatment furnace. Furthermore, carburizing and hardening requires a long period for the heat treatment.

On the other hand, in the induction hardening, both side surfaces of the guide rail are locally hardened focusing on the ball rolling grooves. Therefore, it is unnecessary to subject the guide rail to the carburization preventing treatment. In addition, since it is unnecessary to provide a heat treatment furnace, the dimension of the workpiece is not limited by that of the furnace. Furthermore, the subjecting period for the heat treatment is extremely short. Therefore, induction hardening has an advantage over carburizing and hardening.

However, conventional induction hardening for guide rails still presents problems. That is, as shown in FIG. 7, the boundaries 6 between a soft portion 5 which is not hardened and the hardened layers 3 are formed by the induction hardening so as to extend obliquely from the upper surface of the guide rail 1 to both side surfaces thereof. Therefore, the hardened layers 3 do not extend to the lower surface of the guide rail serving as a rail mounting surface.

As shown in FIG. 8, a moving body mounted on a slider 7, which moves along the guide rail 1, applies its weight as a repeated load W to the guide rail 1 through the slider 7 and rolling balls 16. The repeated load W causes a shearing force acting on the boundaries 6 to generate a crack 8 in the guide rail 1. There is a possibility that the guide rail 1 will fail due to the crack.

SUMMARY OF THE INVENTION

The present invention has been achieved to eliminate difficulties accompanying a conventional guide rail, in view of the fact that a conventional high-frequency heat treatment directs its quality to only the ball rolling grooves.

An object of the present invention is to provide a guide rail for a linear guide apparatus which has hardened surface layers which are sufficient to receive the shearing force which is applied to the guide rail during operation of the linear guide apparatus, the guide rail having a high-frequency hardening pattern in section which differs from a pattern obtained by the conventional high-frequency heat treatment.

The foregoing object of the present invention has been achieved by the provision of a guide rail for a linear guide apparatus with a plurality of rolling elements and a slider, the guide rail including a pair of rolling grooves formed in side surfaces of the guide rail for supporting the slider through the rolling elements, the rolling-element rolling grooves axially extending in parallel with each other, a pair of hardened surface layers formed continuously all over the side surfaces by subjecting the side surfaces to induction hardening, and a hole formed in a soft portion existing between the hardened surface layers for fixing the guide rail on a mounting base.

It is preferable that the hardened surfaces layers are substantially uniform in depth.

In the guide rail, the boundary between each of the hardened surface layers formed by subjecting both side surfaces of the guide rail to induction hardening, and the remaining portion of the guide rail which is not hardened, extends continuously between the upper and lower surfaces of the guide rail with a substantially uniform depth.

An external load applied to the guide rail through the rolling balls and the ball rolling grooves is all received by the hardened surface layers which extend from the upper surface of the guide rail to the lower surface which also serves as a mounting surface through which the guide rail is mounted on the mounting base. On the other hand, the soft portion of the guide rail which is not hardened supports the hardened surface layers. Hence, even when a shearing force is applied to the boundary between each of the hardened surface layers and the soft portion, it is dispersed in the boundary which is sufficiently large in area, so that no cracks are formed therein.

DETAILED DESCRIPTION OF THE PREFERRED EMBODIMENTS

Description will be given below in detail of an embodiment according to the present invention with reference to the accompanying drawings.

Figure 1:
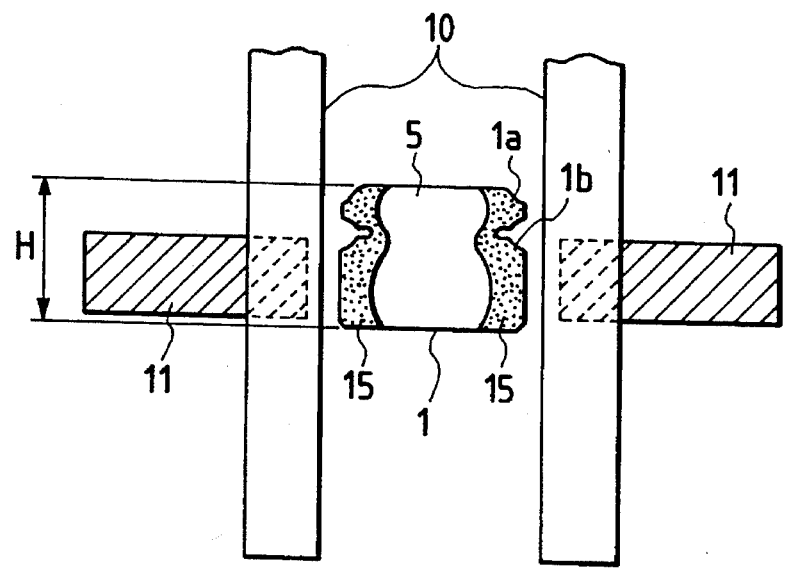
FIG. 1 is an explanatory diagram for a description of a high-frequency heat treatment to subject a guide rail according to the present invention.

In FIG. 1, a guide rail 1 according to the present invention has a substantially square-shaped section perpendicular to the axial direction, and has a pair of ball rolling grooves 1a of a quarter circular cross-section formed along the upper edges of both side surfaces, respectively, and a pair of ball rolling grooves 1b of a half circular cross-section formed slightly above the middle of the side surfaces. The ball rolling grooves 1a and 1b extend in parallel with the longitudinal axis of the guide rail 1 (or in the direction perpendicular to the surface of FIG. 1).

Figure 2:
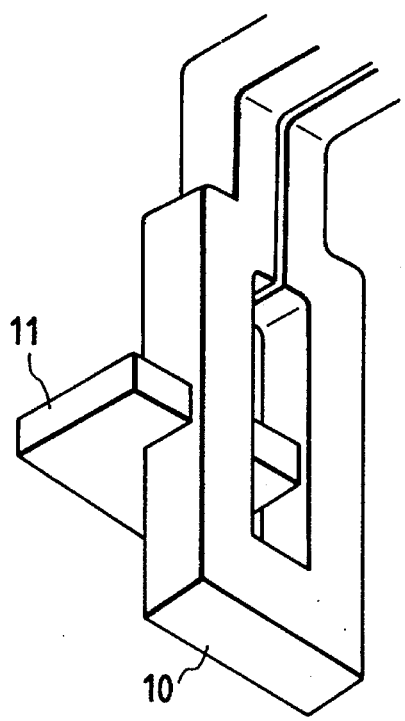
FIG. 2 is a perspective view showing a part of a high-frequency heating device employed in the present invention.
Figure 3:
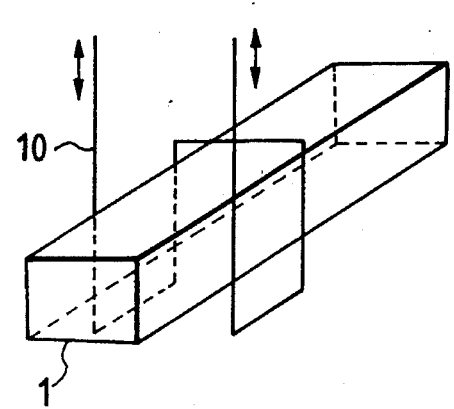
FIG. 3 is an explanatory diagram outlining the arrangement of an induction coil in the high-frequency heating device shown in FIG. 2.

With the guide rail 1 as a workpiece 1 which is to be subjected to a heat treatment, an induction coil 10 for high-frequency induction hardening is arranged adjacent to both side surfaces of the guide rail 1 and so that it extend over the entire height H of the guide rail 1. The induction coil 10 forms a coil loop as shown in FIGS. 2 and 3, and is connected to a high-frequency power source (not shown). When high-frequency current flows in the induction coil 10, high-frequency induction current is generated to flow in both side surface layers of the guide rail which include the upper and lower ball rolling grooves 1a and 1b so as to heat the entire surfaces of those surface layers. In this operation, the upper ball rolling grooves 1a formed in the upper edge portions of the guide rail 1, and the lower edge portions of the guide rail 1 are increased to a predetermined temperature because the heat concentrates thereon. On the other hand, each of the lower ball rolling grooves 1b is define in a recess. Therefore, the grooves 1b are not sufficiently heated as well as flat portions of the side surface layers which are below those grooves 1b. In order to overcome this difficulty, the present invention employs the following method: That is, cores 11 are coupled suitably to the induction coil 10 so that the magnetic flux of the induction coil is effectively concentrated on the grooves 1b and flat portions which are otherwise insufficiently heated in the conventional method.

After the side surfaces of the guide rail 1, which includes the upper and lower ball rolling grooves 1a and 1b, are substantially uniformly heated in the above-described manner, a cooling device (not shown) arranged beside the induction coil 10 is operated to eject cooling water to the guide rail 1 in all directions so that the guide rail 1 is quickly cooled down. Although the guide rail 1 may be deformed (or bent) by the above-described heat treatment, the deformation can be eliminated by finely controlling the amount of cooling water ejected from the cooling device.

In the above-described heating operation, if the guide rail 1 is moved axially, the induction coil 10 can heat the entire length of the guide rail 1.

Figure 4:
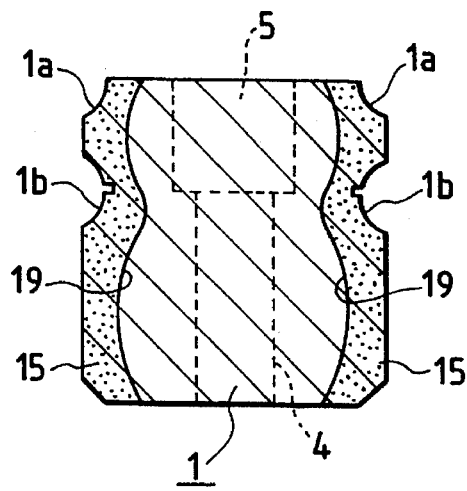
FIG. 4 is a sectional view of the guide rail according to the present invention.

Thus in both side surfaces of the guide rail 1 which include the ball rolling grooves 1a and 1b, each of right and left hardened surface layers 15 is formed with a predetermined hardness and substantially uniform hardened depth between the upper and lower surfaces of the guide rail 1, covering the entire height H of the guide rail 1. As a result, the guide rail 1 thus treated has a section as shown in FIG. 4. In the guide rail 1, the portion between hardened surface layers 15 is not hardened; that is, it is a soft portion 5. The boundaries 19 between the soft portion 5 and the hardened surface layers 15 are large in area because they extend from the upper surface of the guide rail 1 to the lower surface thereof.

In the above-described embodiment, the deformation (or bend) of the guide rail 1 due to the heat treatment is eliminated by finely controlling the amount of cooling water ejected from the cooling device, and the hardened surface layers 15 are substantially equal in depth. Hence, the guide rail is balanced in hardening pattern so that bending of the guide rail due to the hardening operation is minimized.

In the guide rail, the large portion existing between the right and left hardened surface layers 15 remains in the unhardened state as the soft portion 5. Hence, holes 4 for rail-mounting bolt can be readily formed in the soft portion 5.

Figure 5:
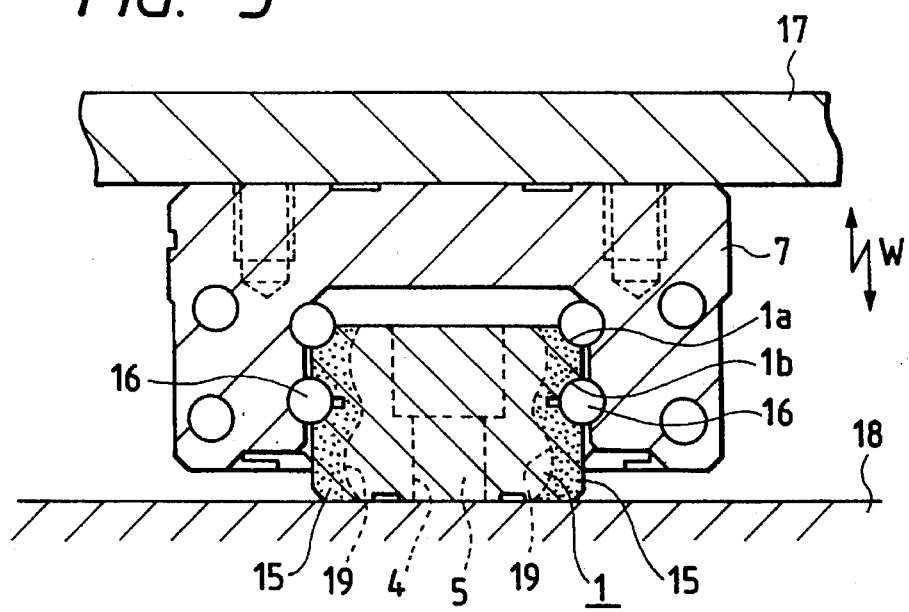
FIG. 5 is a sectional view showing the use of the guide rail shown in FIG. 4.
Figure 6:
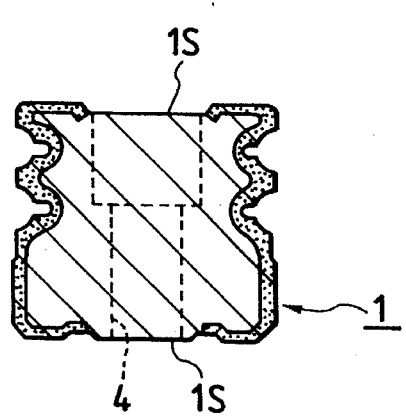
FIG. 6 is a sectional view for a description of a heat treatment to which a conventional guide rail is subjected.
Figure 7:
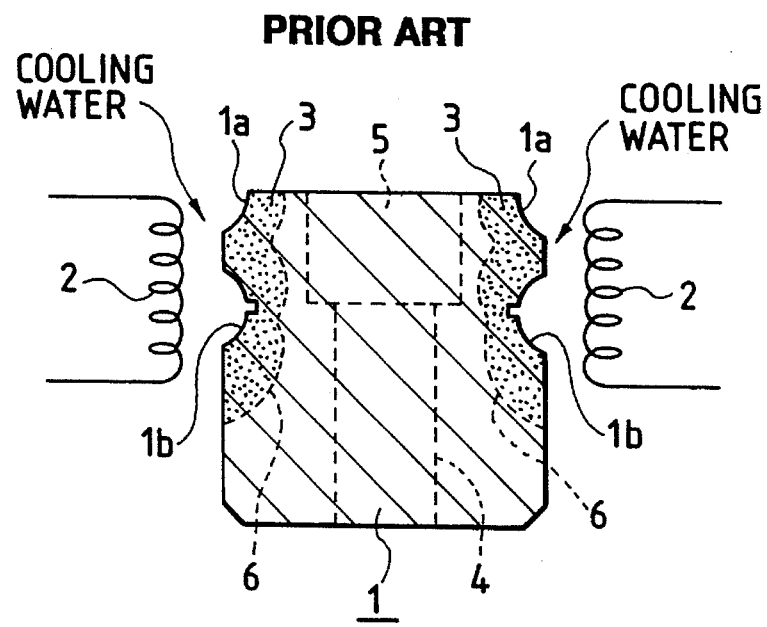
FIG. 7 is an explanatory diagram showing a high-frequency heat treatment to which a conventional guide rail is subjected.
Figure 8:
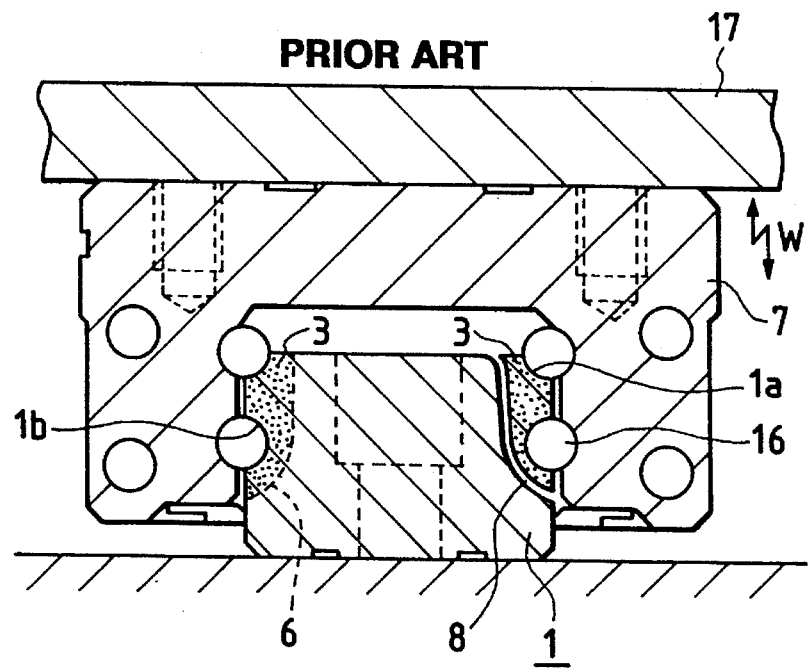
FIG. 8 is a sectional view for a description of the use of the guide rail which has been subjected to the conventional high-frequency heat treatment shown in FIG. 7.

FIG. 5 shows the linear guide apparatus in operation. In the apparatus, a slider 7 is mounted through rolling balls 16 on the guide rail 1 in which the hardened surface layers 15 are formed in the above-described manner, and a moving body 17 is mounted on the slider 7. In operation, the moving body 17 is repeatedly moved back and forth together with the slider 7. Therefore, the weight load of the moving body 17 is repeatedly applied to the guide rail 1 through the slider 7, the balls 16, and the ball rolling grooves 1a and 1b. This repeated weight load is entirely received by the hardened surface layers 15 which are extended from the upper surface of the guide rail 1 to the lower surface thereof, thus being transmitted to the mounting base 18 on which the guide rail is mounted. On the other hand, the soft portion 5 resiliently supports the hardened surface layers 15. Even when a shearing force is applied to the boundaries 19 between the hardened surface layer 15 and the soft portion 5, the shearing force is dispersed in the boundaries 19 which are sufficiently large in area, so that no cracks are formed therein.

In the above-described embodiment, balls are employed as rolling elements in the grooves; however, instead of the balls, rollers may be employed.

Furthermore, in the above-described embodiment, the upper ball rolling grooves 1a are of a quarter circular cross-section. However, a guide rail can be formed in a type which has upper ball rolling grooves of a half circular cross-section which are similar to the lower ball rolling grooves 1b. Moreover, in the above-described embodiment, both side surfaces of the guide rail 1 have two ball rolling grooves; however, the number of ball rolling grooves in each of the side surfaces may be one or more than two.

As described above, the rail guide of the present invention has the hardened surface layers which are formed by subjecting both sides surfaces to induction hardening in such a manner that those layers extend continuously from the upper surface of the guide rail to the lower surface thereof with a substantially uniform depth. Hence, an external load applied to the guide rail through the rolling balls and the ball rolling grooves is received by the hardened surface layers which extend up to the lower surface of the guide rail which also serves as a mounting surface through which the guide rail is mounted on a mounting base. This feature eliminates the possibility that cracks are formed by a shearing force repeatedly applied to the ball rolling grooves of the guide rail. In addition, bending of the guide rail due to the heat treatment can be minimized.

What is claimed is:

1. A guide rail for a linear guide apparatus including a plurality of rolling elements and a slider, the guide rail comprising:

a pair of rolling grooves formed in side surfaces of the guide rail for supporting the slider through the rolling elements, the rolling-element rolling grooves axially extending in parallel with each other;

a pair of hardened surface layers formed continuously over a length of the side surfaces measured perpendicular to the rolling grooves by subjecting the side surfaces to induction hardening; and a soft portion existing between the hardened surface layers and having the same length as the hardened surface layers, a hole being formed in the soft portion for mounting the guide rail.

2. The guide rail of claim 1, wherein each of the hardened surfaces layers has a depth which is substantially uniform.

* * * * *